United States Patent [19]

El-Hibri et al.

[11] Patent Number: 5,206,311

[45] Date of Patent: * Apr. 27, 1993

[54] BLENDS OF POLYETHER SULFONES AND COPOLYMIDES

[75] Inventors: M. Jamal El-Hibri, Roswell, Ga.; John L. Melquist, Naperville, Ill.

[73] Assignee: Amoco Corporation, Chicago, Ill.

[ * ] Notice: The portion of the term of this patent subsequent to Mar. 2, 2010 has been disclaimed.

[21] Appl. No.: 768,005

[22] Filed: Sep. 30, 1991

[51] Int. Cl.$^5$ .................. C08L 77/00; C08L 77/06
[52] U.S. Cl. ............................ 525/434; 525/436
[58] Field of Search ...................... 525/434, 436

[56] References Cited

U.S. PATENT DOCUMENTS

| | | | |
|---|---|---|---|
| 3,422,061 | 1/1969 | Gall | 260/47 |
| 3,634,355 | 1/1972 | Barr et al. | 260/47 |
| 3,658,938 | 4/1972 | Kwiatkowski et al. | 525/436 |
| 4,008,203 | 2/1977 | Jones | 260/49 |
| 4,108,837 | 8/1978 | Johnson et al. | 528/126 |
| 4,175,175 | 11/1979 | Johnson et al. | 528/125 |
| 4,293,670 | 10/1981 | Robeson et al. | 525/436 |
| 4,371,672 | 2/1983 | Younes | 525/391 |
| 4,503,168 | 3/1985 | Hartsing, Jr. | 525/436 |
| 4,681,928 | 7/1987 | Berger et al. | 528/353 |
| 4,684,674 | 8/1987 | Brooks | 523/205 |
| 4,713,426 | 12/1987 | Harris et al. | 525/471 |
| 4,713,438 | 12/1987 | Harris et al. | 528/337 |
| 5,013,799 | 5/1991 | Giles, Jr. et al. | 525/436 |
| 5,036,146 | 7/1991 | Hedtmann-Rein et al. | 525/436 |
| 5,037,902 | 8/1991 | Harris et al. | 525/436 |
| 5,071,925 | 12/1991 | Rostami | 525/434 |
| 5,079,308 | 1/1992 | Harris et al. | 525/471 |

FOREIGN PATENT DOCUMENTS 59-122547  7/1984  Japan.
8303417   10/1983  PCT Int'l Appl..

Primary Examiner—Melvyn I. Marquis
Assistant Examiner—Helen F. Lee
Attorney, Agent, or Firm—Richard J. Schlott; Stephen L. Hensley; Frank J. Sroka

[57] ABSTRACT

Blends comprising a polyether sulfone and an imide-containing copolymer of sulfonyl bis(phthalic anhydride), 1,4-bis(p-aminocumyl) benzene and at least one of a selected group of diamine comonomers. The blends display a unique combination of excellent mechanical and thermal properties as well as good solubility and easy melt-fabricability; in addition, the resin components are compatible, and many compositions are unexpectedly miscible.

14 Claims, No Drawings

BLENDS OF POLYETHER SULFONES AND COPOLYMIDES

BACKGROUND OF THE INVENTION

This invention relates to aromatic polyimides and, more particularly, to blends comprising novel imide copolymers and polyether sulfones. The blends are miscible, and display excellent mechanical properties combined with high thermal stability, low water absorption and good melt-fabricability.

Aromatic polyimides have been known for over 30 years, and a variety of imide-containing polymers are readily available from commercial sources. Polyimides are generally recognized as excellent in heat resistance characteristics, but difficult to process. Though linear, polyimides do not behave as thermoplastics and melt-processing using injection molding or extrusion is difficult if not impossible for most members of this class of polymers. Fabrication of wholly aromatic polyimide molding powders may be accomplished in most instances only by sintering at high temperature and pressure, using techniques and procedures analogous to those used in powder metallurgy.

Solution processes such as dope casting also have very limited application to the processing of polyimides due to the characteristic insolubility of wholly aromatic polyimides. Where solution fabrication of polyimides is desired, such as for the production of coatings and film, the process generally carried out with the soluble polyamide-acid precursor, i.e., the form of the polymer prior to imidization. The subsequent step of thermally-inducing ring closure of polyamide-acids in the fabricated article to provide the polyimide is accompanied by evolution of water, making the fabrication of void-free articles extremely difficult and tedious.

Polyimides described as thermoplastic are also known including, for example, polyimides derived from 1,4-bis(p-aminocumyl) benzene, disclosed broadly in U.S. Pat. No. 4,681,928. Tetramethyl analogs of the polyimide are also known in the art. Such polyimides are described as soluble, having high glass transition temperatures and good mechanical and thermal properties.

Imide-based resins derived from diphenyl sulfone tetracarboxylic acid dianhydride, also called sulfonyl bis(phthalic anhydride) or "SPAN", are also known in the art, and are described in, for example, U.S. Pat. No. 3,422,061.

Polyimides having isopropylidene linkages have been described in the art and, more recently, blends of such polyimides with poly(aryl ether sulfones) or PAES have also been described, for example, in commonly assigned U.S. Pat. No. 5,037,902. The disclosure of the patent also includes polyimides derived from sulfonyl bis(phthalic anahydride) and 1,4-bis(p-aminocumyl) benzene.

Polyimides, including those described in the art as melt-processable, are known to exhibit some shortcomings. Seeking to overcome the deficiencies, the art has turned to condiseration of blends comprising two or more thermoplastics. These efforts have resulted in identifying blends having a unique balance of properties not achievable by a single polymer, and such blends have found wide commercial application. Most polymers are incompatible, and although blends of incompatible polymers may have utility for many uses, blends comprising compatible and preferably miscible polymers generally exhibit more desirable mechanical properties, improved optical clarity and physical uniformity, together with better thermal performance and improved processing characteristics. Such blends often find wider acceptance and, where adequate compatibility is lacking, the art has often sought additives to be included with the polymeric components to act as compatibilizing agents, enhancing compatibility of the polymeric components and in turn further improving important blend properties.

Compatibility and miscibility with other polymers, together termed "alloyability" are thus clearly considered by the art to be desirable polymer characteristics, and alloyability is capable of conferring a definite commercial advantage for such resins. In U.S. Pat. No. 5,037,902 there are described blends comprising poly(aryl ether sulfones) and certain polyimides derived from 1,4-bis(p-aminocumyl) benzene. According to the patent, only poly(aryl ether sulfones) comprising biphenyl units are generally miscible with polyimides derived from 1,4-bis(p-aminocumyl)benzene, and the presence of biphenyl units in the poly(aryl ether sulfone) unit is said to therefore be critical to attaining miscibility over a wide range. The patent defines miscibility as the presence of a single Tg for the blend, intermediate between the Tg values for the individual components, and recognizes that some combinations may be partially miscible, defined as miscibility of the two resin components over less than the entire range of compositions. Resin formulations comprising these blends have good high temperature properties while remaining thermally processable. However, such blends are lacking in toughness, particularly in impact properties, and their acceptability for many applications will thus be somewhat limited. In addition, biphenyl-containing poly(aryl ether sulfone) resins are less readily available than many sulfone-containing resins, and may be more costly, factors that somewhat limit their commercial acceptance. Polyether sulfone resins are readily available from commercial sources. These resins are typically more readily processable than the corresponding biphenyl-containing poly(aryl ether sulfone) resins and are substantially lower in cost, yet have the toughness and chemical resistance needed for use in a wide variety of applications. Although polyether sulfones have a high Tg of about 220° C., they may be somewhat lacking in high temperature properties, and their acceptability for use under more demanding environmental conditions may be somewhat limited as a result. A method for extending the temperature range in which polyether sulfones may be used could increase the acceptance of such materials for use in extreme environments, particularly where the chemical resistance of sulfone-containing polymers is needed. Compositions comprising polyether sulfones which are useful over a widened temperature range and have improved strength and rigidity while retaining the good processability of the polyether sulfones would clearly represent a useful advance in the art.

SUMMARY OF THE INVENTION

The blends of this invention comprise a polyether sulfone and an imide-containing copolymer comprising sulfonyl bis(phthalic anhydride), 1,4-bis(p-aminocumyl)benzene and at least one of a selected group of diamine comonomers. The blends display a unique combination of excellent mechanical and thermal properties as well as good solubility and easy melt-fabricability; in addition, the resin components are compatible and many compositions were unexpectedly found to be miscible.

DETAILED DESCRIPTION OF THE INVENTION

The blends of this invention comprise a polyether sulfone resin and a polyimide.

The polyimide component of the blends of this invention are imide-containing copolymers. The copolymers may be conveniently described as copolyimides derived from the dianhydride sulfonyl bis(phthalic anhydride) ("SPAN"), the diamine 1,4-bis(p-aminocumyl) benzene ("BAP") and, as a comonomer diamine, at least one aromatic diamine selected from the group consisting of m-phenylene diamine ("MDA"), p-phenylene diamine ("PDA"), oxybisaniline ("ODA"), 2,2-bis(4-aminophenyl) propane and 2,2-bis(4-aminophenoxyphenyl) propane ("BAPP"). More preferably, the diamine comonomer will be at least one diamine selected from ODA, MDA and PDA, and still more preferably the diamine will be PDA.

The diamine component of the polyimide may comprise from about 10 to about 90 mole % BAP diamine, based on total aromatic diamine, the balance being the diamine comonomer or comonomers.

The polyimides of the present invention may be prepared by any of the conventional methods ordinarily used in the production of aromatic polyimides. For example, the SPAN dianhydride may be combined and reacted with the diamines to produce a polyamide-acid, which may then be chemically or thermally dehydrated to form the polyimide.

The reaction of the dianhydride and diamines may be conveniently carried out in an inert liquid medium, i.e. a liquid that does not react with the polyamide-acid or any of the starting components to any appreciable extent. In addition to being inert, the liquid medium will preferably be a solvent for the polyamide-acid and must be a solvent for at least one, preferably all, of the reactants. Normally, liquid organic solvents of the N,N-dialkylcarboxyamide class may be employed, including N,N-dimethylformamide and N,N-dimethylacetamide, N,N-diethylformamide, N,N-diethylacetamide, N,N-dimethylmethoxyacetamide, N-methyl caprolactam, and the like, as well as dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone and phenols such as m-cresol. Also very useful for the preparation of the polyimides of this invention are the diaryl sulfones and diaryl ketones such as diphenyl sulfone and benzophenone. The solvents may be used alone or as mixtures, and may be combined with poorer solvents and non-solvents such as benzene, benzolitrile, dioxane, xylene, toluene and cyclohexane.

The quantity of organic solvent used in the polymerization process may be only the amount needed to dissolve enough of one reactant, preferably the diamine, to initiate the reaction of the diamine and the dianhydride. However, the preferred process will employ sufficient solvent to provide a polymer solution having a solution viscosity within a practical range. Generally, the amount of solvent will be sufficient to provide a solution of polyamide-acid comprising from about 0.05 to about 40 wt % of the polymeric component.

The polymerization temperature is not particularly critical. Generally, it is possible to form the copolymers by conducting the reaction below 100° C.; however, temperatures up to 175° C. and even higher may be employed if desired. In order to obtain the maximum inherent viscosity, i.e., maximum degree of polymerization for any particular combination of diamine, dianhydride, solvent, etc., the optimum temperature throughout the polymerization will generally be found to be below 60° C., preferably below 50° C. Hence, the use of temperatures in the range of from about ambient temperature, i.e. about 15° C. to about 60° C. will be preferred.

The degree of polymerization of the polyamide-acid may desirably be controlled, either by employing an imbalance in the dianhydride-diamine stoichiometry or through use of chain terminating agents. Thus, equal molar quantities of dianhydride and diamine provide polyamide-acids of very high molecular weight, while use of either reactant in excess will limit the extend of polymerization. Addition of a chain terminating agent such as phthalic anhydride, to "cap" the ends of the polymer chains, will also limit the molecular weight and will often improve the thermal and oxidative stability of the final polyimide. Typical capping agents include monoanhydrides or monoamines such as phthalic anhydride, aniline, p-methylaniline and the napthyl analogs thereof, and monoisocyanates.

Although the polyamide-acid may be of any convenient molecular weight, extremely low molecular weight products generally exhibit poor mechanical properties. The inherent viscosity of the polyamide-acid, a recognized measurement reflective of molecular weight, will thus be at least 0.1 and preferably greater than about 0.3 dl/g when determined at 25° C. at a concentration of 0.5 percent by weight of the polymer in a suitable solvent such as N-methylpyrrolidone. Such polymers will generally give, on further processing, polyimides having useful mechanical properties. Even though polymers with extremely high molecular weights may be quite useful, solutions of such high molecular weight polyamide-acids become extremely high in viscosity, and processing becomes substantially more difficult. Therefore, as a practical matter, the inherent viscosity of the polyamide-acid will preferably be less than about 1.5 dl/g, and the inherent viscosity of the preferred polyamide-acids will thus lie in the range of from about 0.3 to about 1.5 dl/g.

To provide the polyimides according to the invention, the polyamide-acid will be converted to the polyimide in a subsequent reaction step, ordinarily by being treated with a dehydrating agent. The dehydrating agent may be a compound selected from acetic anhydride, lower fatty acid anhydrides such as propionic anhydride, butyric anhydride, valeric anhydride and the like, and aromatic monobasic acid anhydrides such as the anhydride of benzoic acid and the anhydrides of the toluic acids, the ethylbenzoic acids, propylbenzoic acid, isopropylbenzoic acid, anisic acid, the nitrobenzoic acids, the halogen-substituted benzoic acids, and the like.

The dehydration may be employed in combination with a tertiary amine, and particularly preferred is an acetic anhydride-pyridine mixture. Tertiary amines having approximately the same activity as the preferred pyridine that may be used in the process include isoquinoline, 3,4-lutidine, 3,5-lutidine, 4-methylpyridine, methylpyridine, 4-isopropylpyridine, N,N-dimethylbenzyl amine, 4-benzylpyridine and N,N-dimethyldodecyl amine. These amines are generally used in a quantity of from about 0.3 mole to about 1.0 mole per mole of the anhydride converting agent. Trimethylamine and triethylene diamines are much more reactive and will generally be used in still smaller amounts. Amines less reactive than pyridine such as 2-ethylpyridine, 2-methylpyridine, triethylamine, N-ethylmorpholine, N-methylmorpholine, N,N-diethylcyclohexylamine, N,N-dimethylcyclohexylamine, 4-benzoylpyridine, 2,4-lutidine, 2,6-lutidine and 2,4,6-collidine may also be used, although generally in larger amounts.

An alternative method for converting the polyamide-acid to the polyimide is by thermal dehydration, generally in bulk and preferably in the form of a shaped article, e.g., film or filament comprising the polyamide-acid. To remove minor amounts of solvent and the moisture produced in the reaction and thus reduce or prevent foaming and the formation of voids, the dehydration will be preferably conducted in a step-wise manner and in an inert gas atmosphere, starting by heating at a temperature of about 100° C. and increasing the temperature progressively to about 300° C. or even higher.

Other useful reaction catalysts for the imidization of the polyamide-acid are the metal acetylacetonates which are described in, for example, U.S. Pat. No. 4,421,905. The acetylacetonate-promoted reaction is advantageously conducted at a temperature in the range of about 70° C. to 150° C., preferably in the range of about 100° C. to 140° C. When the temperature is in the upper portion of these ranges, the imidization reaction is substantially completed in 2 to 4 hours. The metal acetylacetonate is advantageously used in an amount of at least 0.005 gram, preferably at least 0.01 gram per equivalent weight of dianhydride and generally there is no need to exceed 1 gram of metal acetylacetonate to obtain the desired results. Advantageously, the metal acetylacetonate is used in an amount of 0.005 to 1 gram of metal acetylacetonate, preferably 0.01 to 0.05 gram per gram of aromatic dianhydride.

An alternative and well-known process suitable for producing polyimides, including the polyimides of this invention, has the advantage of being carried out in a single reaction step, thereby avoiding the production of an intermediate polyamide-acid. The process, accomplished through reaction of the dianhydride with diisocyanate analogs of the diamines, is carried out under substantially anhydrous conditions. The progress of the reaction can be followed by any of the routine analytical techniques such as following the viscosity increase of the reaction solution or the evolution of carbon dioxide. Inasmuch as the polyimides of this invention are soluble, when produced by the reaction of the dianhydride with diisocyanates and employing a suitable solvent, they remain in solution and can be used as such. In the alternative, they may be precipitated by addition of an appropriate liquid in which the polyimide is insoluble or has low solubility.

The polyimides of the instant invention can be of any molecular architecture; i.e., they can be random, alternating or block copolymers. Processes ordinarily employed for producing polyamide-acid by directly combining the dianhydride with the mixture of diamines will generally provide random copolymers. Alternative reaction methods, including sequential addition and the combining of separately-prepared homopolyamide-acids, are known to be useful for the production of block and alternating copolymers, and such processes may be conveniently employed for producing polyamide-acids and imide-containing copolymers according to this invention.

The polyether sulfone resins useful in forming the blends of this invention may be more particularly characterized and conveniently described as polyether sulfone polymers formed by the condensation polymerization of 4,4'-dichlorodiphenyl sulfone with 4,4'-dihydroxydiphenyl sulfone, optionally including additional dihydric phenols such as hydroquinone. These thermoplastic polymers and copolymers are readily molded and extruded, and have been widely accepted in the art for use in a great variety of commercial applications. Among the many such thermoplastics readily available from commercial sources are the VICTREX® polyether sulfone resins from ICI, Ltd., the RADEL® A series of polyether sulfone resins from Amoco Performance Products, Inc. and thermoplastics supplied under the ULTRASON® mark by BASF. The preparation of these thermoplastic resins is well-described in the art.

The polyether sulfone and copolyimide components of the blends of this invention are generally compatible, and many such blends are fully miscible in all proportions. As will be further demonstrated by the examples presented herein below, for copolyimides wherein the diamine component of the copolyimide comprises BAP and PDA, the blends with polyether sulfone are compatible and generally miscible where the BAP:PDA mole ratio is about 1:1 and greater. However, copolyimides having BAP:PDA ratios of about 2:1 and greater will form miscible blends having improved clarity and transparency.

Blends of copolyimides wherein the diamine component comprises BAP and diamines other than PDA, as well as those wherein the BAP:PDA mole ratio is below 1:1, generally exhibit partial miscibility. By partial miscibility is meant that the blends are not miscible, defined as exhibiting a single Tg, over the entire range of possible compositions. Partially miscible blends form compositions characterized by the presence of two ordinarily compatible phases, each phase comprising a solution of the two resin components in a weight ratio that will be miscible. The existence of two blend phases may often be demonstrated by the presence of two Tg's, each ordinarily lying within the temperature range between the Tg's for the neat resin components. However, the two blend phases may have similar Tg values. Detection then becomes more difficult and other indices of partial immiscibility are relied upon, such as the presence of haze, or a single Tg that remains essentially unvarying over a wide range of composition variation.

Partially miscible blends differ from blends that are completely immiscible in that such completely immiscible blends will also generally comprise two phases, with each phase ordinarily containing a single resin component. The two Tg's exhibited by a substantially immiscible blend will lie at or near the Tg values for the individual components. Further, for completely immiscible blends, the two phases present are often incompatible as well, becoming physically separated during fabrication or when placed under slight stress and causing delamination and consequent disintegration of articles molded or extruded from such incompatible components.

Compositions comprised of polyether sulfone with copolyimides based on SPAN, BAP and aromatic diamines other than PDA, even though partially miscible or even immiscible, may also have an important and useful balance of mechanical properties. For example, blends comprising copolyimides formed from BAP with MDA or BAPP as the diamine comonomer are not miscible in all proportions. Even when partially miscible as shown by the presence of two Tg values, such blends have good rigidity and improved impact properties, and are more processable than the neat copolyimides. However, inasmuch as miscible, transparent blends are generally considered by the art to be more desirable for many applications, blends according to this invention comprising the copolyimides derived from SPAN, BAP and PDA will be most preferred.

The blends may be formed by any of the conventional methods known to those skilled in the resin compounding art for producing blends of thermoplastic resins, including solution blending, dry blending or milling followed by melt processing, extrusion compounding and the like. As an alternative to such processes, copolymerization of the polyimide monomer components, either in a solvent or in the melt, may be carried out in the presence of the poly(aryl ether sulfone), thereby providing an intimate blend of the resin components. There have been recently described, for example in U.S. Pat. No. 5,037,902, processes whereby the polyimide is formed during thermal processing of the reaction mixture in an extruder or similar device. The process, termed reactive extrusion compounding, is carried out by feeding a mixture of the dianhydride, the diamines and the polyether sulfone to a compounding extruder. In the alternative, the poly(aryl ether sulfone) may be first plasticated at a temperature in the range of 200° C. to 400° C., followed by addition of the monomers. Such processes may provide significant economic advantages including avoiding the cost of solvent recovery by eliminating the use of solvents.

The invention will be better understood by consideration of the following examples, which are provided by way of illustration and not in limitation thereof.

EXAMPLES

The following materials, abbreviations and test procedures are employed in the Examples.

Monomers

The following dianhydride and the diamine monomers are well known in the art, and all may be readily obtained from a variety of commercial sources.

SPAN: Sulfonyl bis(phthalic anhydride), a dianhydride having the structure:

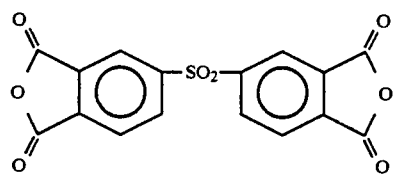

BAP: 1,4-bis(p-aminocumyl)benzene, commonly referred to as bisaniline P:

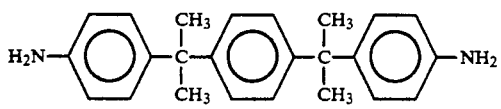

PDA: p-Phenylene diamine:

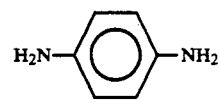

MDA: m-Phenylene diamine;

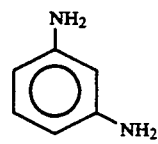

ODA: Oxydianiline, otherwise known as 4,4'-diaminodiphenyl ether:

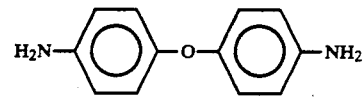

BAPP: 2,2-bis(4-aminophenoxyphenyl) propane, an aromatic diamine having the structure:

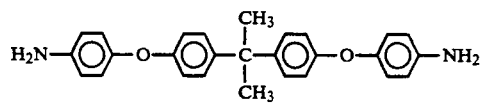

Polyether Sulfones

The polyether sulfones used in the examples that follow have been given the designations PES-III and PES, and may be described as follows:

PEA-III: A copolymer of 4,4'-dihydroxydiphenyl sulfone and hydroquinone, in a molar ratio of 3/1, with 4,4'-dichlorodiphenyl sulfone having a reduced viscosity in N-methylpyrrolidone (NMP) at a concentration of 0.2 g/dl and 25° C. of about 0.50 dl/g.

PES: A polyether sulfone polymer of 4,4'-dihydroxydiphenyl sulfone with 4,4'-dichlorodiphenyl sulfone having a reduced viscosity and molecular weight values substantially equivalent with those of PES-III. Obtained as VICTREX ® 4100G thermoplastic from Imperial Chemical Industries, PLC.

Test Methods

I.V.: Polyimide inherent viscosities (I.V.) were measured at 30° C. as 0.5 g/dl solutions in NMP using a Cannon-Fenske viscometer.

Tg: The following methods were used for determining glass transition temperatures (Tg):

(1) DSC, or differential scanning calorimetry, conducted at a heating rate of 20° C./min using a DuPont Model 910 thermal analyzer controlled by an Omnitherm Advantage II controlling system. Tg was measured during the second heat after quench of the first heat, and is defined from the onset of the change in heat capacity.

(2) DMTA, or dynamic mechanical thermal analysis, conducted using a Polymer Laboratories tensile unit by employing a sinusoidal tensile force at a frequency of 1 Hz and a heating rate of 3° C./min. Tg is defined as the maximum in loss tangent (tan δ), determined by the ratio of the dynamic loss modulus (E″) to that of the storage modulus (E′).

The DMTA Tg measurement technique boasts excellent sensitivity to polymer phase transitions and thus allows detection of miscibility or partial miscibility between two or more polymers in a blend. Typically, Tg values obtained by DMTA are higher than those determined by DSC, by about 10° C.

The term miscibility, when used herein to characterize a polymer blend, means a polymer blend characterized by the presence of a single Tg intermediate to those of the constituent components. Since the Tg of the polyimides of this invention are at least 50° C. higher than those of the polyether sulfone, miscibility could be judged based on this technique almost unequivocally.

Clarity in a compression-molded specimen of a resin blend gives additional supporting evidence that the blend is miscible. However, inasmuch as clarity of a blend is possible also when polymer phases in the blend possess the same or very close refractive indices, clarity alone is not considered sufficient.

Tensile properties were measured substantially according to ASTM-D638. The nominal gauge dimensions of the specimens tested were 2″ length×0.125″ width×0.02″ thickness. Tensile modulus was measured as the 1% secant modulus value, calculated on the basis of crosshead travel.

The pendulum impact test used is substantially analogous to the Charpy impact test procedure. The impact strength was determined using 0.125″ wide strips of the compression molded samples clamped between the grips of a pendulum impact tester placed at a distance of 1″ apart. Briefly described: The pendulum is cylindrical, with a diameter of 0.83 inches and weighing 1.562 lbs; the striking piece, mounted essentially at the free end of the pendulum, is a cylinder 0.3″ in diameter; film specimens 4″ long, 0.125″ wide and about 1-30 mils thick are clamped between the jaws of the tester so that the jaws are spaced 1″ apart; the 0.125″ width of the film is mounted transversely exactly beneath the axis of rotation of the pendulum; the pendulum is raised to a constant height to deliver 1.13 ft-lbs at the specimen. When the pendulum is released, the cylindrical striking piece hits the specimen, breaks the film and travels to a measured height beyond the specimen. The difference in the recovery height (i.e. the difference in the potential energy of the pendulum at the maximum point of the upswing) represents the energy absorbed by the specimen during rupture; the impact strength, expressed in ft-lbs/in$^3$ is obtained by dividing the pendulum energy loss by the volume of the specimen, typically 0.0025 in$^3$.

Preparation of Copolyimides

EXAMPLE 1

Copolyimide from SPAN, BAP and PDA [BAP/PDA ratio=2/1]

A copolyimide was prepared from SPAN, BAP and PDA, using phthalic anhydride (PA) as the endcapping agent. The copolyimide was prepared as follows. The diamines, 42.45 g BAP (0.123 mole), 6.56 g PDA (0.0607 mole), were weighed into a one-liter resin kettle. The kettle was immersed in an oil bath at 40° C., purged with nitrogen for 35 min, and then about 450 ml of warmed N-methylpyrrolidone [NMP] were added and the contents were stirred. After the diamines dissolved, 65.22 g SPAN (0.182 mole) were weighed into a powder addition funnel and added to the kettle slowly over a 27 min period. About 50 ml of NMP were used to flush the SPAN residue from the addition funnel into the kettle. After the addition of SPAN was completed, the solution was stirred for 3 hrs and 25 min, then 0.54 g PA (0.0036 mole) were added and an aliquot of the polyamide-acid solution was removed for inherent viscosity determination.

After stirring an additional 1 hr and 50 min, 38.62 ml pyridine and 38.62 ml acetic anhydride (0.409 mole) were added to imidize the polyamide-acid, and stirring was continued overnight. A sample was removed and used to determine the inherent viscosity of the polyimide before the reaction mixture was poured into water to precipitate the polyimide. The collected solids were washed in water and dried in a vacuum oven. The inherent viscosities of the polyamide acid and of the copolyimide as well as the Tg of the copolyimide are listed in Table I.

EXAMPLES 2-7

Additional copolymers were prepared from SPAN and BAP with PDA or other diamines by following substantially the procedures of Example 1. The compositions, monomer ratios and inherent viscosities of the resulting polyamide-acids and the copolyimides are summarized in Table I.

COMPARISON EXAMPLE A

A homopolymer was prepared for comparison purposes from SPAN and BAP, substantially following the procedures of Example 1. The composition, Tg and inherent viscosities of the resulting polyamide-acid and the polyimide are summarized in Table I.

COMPARISON EXAMPLE B

A homopolymer was prepared for comparison purposes from SPAN and BAPP, substantially following the procedures of Example 1. The composition, Tg and inherent viscosities of the resulting polyamide-acid and the polyimide are summarized in Table I.

Additional quantities of selected polyimides were prepared substantially according to the processes of Example 1, and molded to provide test specimens for obtaining mechanical properties. The properties are also summarized in Table I.

TABLE I

Copolyimides Based on SPAN/BAP (Examples 1-7)

| | | EXAMPLE | | | | | | | | |
|---|---|---|---|---|---|---|---|---|---|---|
| | | 1 | 2 | 3 | 4 | 5 | 6 | 7 | A | B |
| SPAN | (moles) | 1 | 1 | 1 | 1 | 1 | 1 | 1 | 1 | 1 |
| BAP | (moles) | 0.67 | 0.5 | 0.67 | 0.9 | 0.8 | 0.7 | 0.9 | 1.01 | — |
| PDA | (moles) | 0.33 | 0.5 | — | — | — | — | — | — | — |
| MDA | (moles) | — | — | 0.33 | — | — | — | — | — | — |
| ODA | (moles) | — | — | — | 0.1 | 0.2 | 0.3 | — | — | — |
| BAPP | (moles) | — | — | — | — | — | — | 0.1 | — | 1.02 |

TABLE I-continued

Copolyimides Based on SPAN/BAP (Examples 1-7)

|  |  | EXAMPLE |  |  |  |  |  |  |  |  |
|---|---|---|---|---|---|---|---|---|---|---|
|  |  | 1 | 2 | 3 | 4 | 5 | 6 | 7 | A | B |
| phthalic anhydr. | (moles) | 0.02 | 0.02 | — | — | — | — | — | 0.02 | 0.04 |
| Polyamide-acid I.V. | (dl/g) | 0.67 | 0.62 | 0.92 | 0.77 | 1.03 | 1.10 | 0.94 | 0.68 | 0.75 |
| Polyimide I.V. | (dl/g) | 0.56 | 0.54 | 0.76 | 0.65 | 0.89 | 0.93 | 0.81 | 0.58 | 0.65 |
| Tg by DSC | (°C.) | 301 | 310 | 295 | 285 | 293 | 289 | 286 | 287 | 256 |
| DMTA Tg | (°C.) | 307 | 305 | 298 | — | 301 | 296 | — | 291 | 248 |
| T. Mod. | Kpsi | 279 | * | 268 | 268 | — | — | 263 | 271 | 276 |
| T. Str. | Kpsi | 13.6 | * | 13 | 10 | — | — | 12.6 | 14 | 14.5 |
| El. | % | 8.3 | * | 7.3 | 5.4 | — | — | 7.5 | 10 | 11.5 |
| Impact | ft-lb/in$^3$ | 21 | * | 13 | 10 | — | — | 10 | 11 | 49 |

Notes:
*Molded specimens were too brittle to be tested.
DMTA Tg = glass transition temperature determined by dynamic mechanical thermal analysis, see text.
T. Mod. = tensile modulus;
T. Str. = tensile strength;
El. = elongation at break;
Impact = pendulum impact.
Tensile properties are at room temperature.
For abbreviations, test methods, see text.

It will be apparent from a consideration of the DSC Tg data for the various examples, summarized in Table I, that copolymers comprising SPAN, BAP and an added diamine comonomer are substantially higher temperature resins than the corresponding homopolymers (compare Examples 1 and 2 with Comparison Example A, and Example 7 with Comparison Example B). The improvement in thermal properties of the copolyimides over the corresponding homopolyimide will be made further apparent by consideration of the values for DMTA Tg for copolyimides with PDA and with MDA as in Examples 1-3, as well as for copolymers with ODA as in Examples 5 and 6.

The copolyimide component of the blends of this invention also form useful blends with a variety of thermoplastics, including selected poly(aryl ether sulfones), aromatic polyamides, poly(amide-imides) and polyimides. However, the blends comprising the aforesaid SPAN-BAP-aromatic diamine copolyimides and selected polyether sulfones are particularly useful.

Blends

The blends of this invention are uniquely compatible compositions comprising copolyimides and polyether sulfone resins. The following examples illustrate the preparation and properties of some of the unique blends comprising copolyimides according to the present invention, compared with those comprising corresponding imide-containing homopolymers. The copolyimide used in these four examples is the same as the one described in Example 1.

EXAMPLE 8

A 50:50 by weight mixture of PES-III and the copolyimide of Example 1 was prepared by first dry-blending 17 g of the PES-III pellets with 17 g of the powdered polyimide. The mixture was dried at least 16 hrs (overnight) under vacuum using a steam-heated vacuum oven operating at about 100° C. and a vacuum level of 28-29 inches Hg. The mixture was then melt-blended in a small twin-blade Brabender mixing bowl at a temperature of 380° C. and a rotational mixing blade speed of 50 rpm. The mixing was performed for 5 min, after which the blend was removed and placed again into a vacuum oven at 100° C. for additional overnight drying. The blend sample was then compression molded using standard compression molding practice into a 4"×4"×0.020" mold cavity using a Hydrolair hydraulic press heated to 360° C. The resulting transparent, amber plaque was next shear-cut into 0.125" wide strips to provide specimens for testing.

The mechanical properties, Tg values and compositions are summarized in Table II.

EXAMPLE 9

Additional blends were prepared substantially as in Example 8. The compositions, Tg values and mechanical properties are summarized in Table II.

Comparison Examples D-E

Additional blends were prepared using PES-III and the SPAN-BAP homopolymer of Example A and molded to provide test specimens, substantially following the methods of Example 8. The compositions, Tg values and mechanical properties are summarized in Table II.

Powder samples of the copolyimide of Example 1 and of the SPAN-BAP homopolymer of Comparison Example A were dried overnight in a vacuum oven, then compression molded at 380° C. to provide 4"×4"×0.020" plaques.

A sample of pellets of the polyether sulfone PES-III used in the blends of Examples 8 and 9 was similarly compression molded at 360° C. The properties of Control Examples A and C are also summarized in the following Table II.

TABLE II

|  |  | Example No. |  |  |  |  |  |  |  |  |
|---|---|---|---|---|---|---|---|---|---|---|
|  |  | 1 | 2 | A | 8 | 9 | 10 | D | E | C |
| PES-III | pbw | — | — | — | 50 | 65 | 50 | 50 | 65 | 100 |
| Copolyimide (Ex. 1) | pbw | 100 | — | — | 50 | 35 | — | — | — | — |
| Copolyimide (Ex. 2) | pbw | — | 100 | — | — | — | 50 | — | — | — |
| Polyimide (Ex A) | pbw | — | — | 100 | — | — | — | 50 | 35 | — |
| DMTA Tg | (°C.) | 307 | 305 | 291 | 255 | 245 | 249 | 241 | 238 | 225 |
| T. Mod. | Kpsi | 279 | * | 271 | 310 | 298 | 306 | 297 | 287 | 255 |
| T. Str. | Kpsi | 13.6 | * | 14 | 13.0 | 13.6 | 11.9 | 13.2 | 11.7 | 11.8 |

TABLE II-continued

| | | Example No. | | | | | | | | |
|---|---|---|---|---|---|---|---|---|---|---|
| | | 1 | 2 | A | 8 | 9 | 10 | D | E | C |
| El. | % | 8.3 | * | 10 | 6.7 | 8.5 | 5.1 | 7.4 | 5.3 | 55 |
| Impact | ft-lb/in$^3$ | 21 | * | 11 | 17 | 44 | 16 | 11 | 33 | 97 |

Notes:
*specimen too brittle to test.
For compositions, abbreviations, test methods see text and notes to Table I.

The blends of Examples 8–10 are considered miscible, even though some haze is present, because they have a single Tg value in each instance lying mid-rage and variable with the relative proportions of the resin components. The mechanical properties for the blends of Examples 8 and 10 compared with those of Comparison Example D, and of Example 9 compared with Comparison Example E, demonstrate that the blends according to the practice of this invention afford higher strength and improved modulus over blends of polyether sulfone resins with the homopolyimides, as well as over the properties for either component. In addition, the blends have higher impact strength than for the corresponding neat copolyimide and are also more readily melt-processed than the neat copolyimide.

The following Examples 10–22 are provided to illustrate further blends, produced by a reactive extrusion process wherein the polyimide comonomers are combined with the polyether sulfone and polymerized during melt-compounding to produce the pelletized blend in a single operation.

EXAMPLE 10

Blend of PES-III with Copolyimide of SPAN, BAP and PDA[BAP/PDA ratio=2/1]

PES-III (195 g), ground through a 2 mm screen, was mixed with 63.58 g SPAN (0.1775 mole), 40.97 g BAP (0.1189 mole), 6.33 g PDA (0.05857 mole) and 0.53 g PA (0.0036 mole). The component mixture corresponded to a 65/35 blend of PES-III and polyimide, by weight. The mixture was fed into a 15 mm vented twin-screw extruder manufactured by APV Chemical Machinery, Inc. The screw design included a feed section approximately 5.3 inches long, a mixing section composed of eight mixing paddles at 60° forward (approximately 2.4 inches long), an orifice plug to provide long residence times, and a discharge section about 1.6 inches long. Extrusions were typically performed at a temperature of 365° C. and a screw speed of 125 rpm. The feed rate was maintained at approximately 60 g/hr using an AccuRate feeder. The product strand was extruded and collected on a winder.

The Tg of the 65/35 blend by weight of polyether sulfone and polyimide was 238° C. by DSC. The blend was transparent and amber in color as extruded and when molded to give a 20 mil-thick compression molded plaque.

EXAMPLE 11

Blend of PES-III with Copolyimide of SPAN, BAP and MDA[BAP/PDA ratio=2/1]

Using the method of Example 10, a 65/35 blend by weight was prepared from 45.5 g PES-III, 14.38 g SPAN (0.0414 mole), 9.56 g BAP (0.0278 mole), 1.48 g MDA (0.0137 mole) and 0.12 g PA (0.0008 mole). The Tg of the blend by DSC was 234° C., and the blend was transparent and amber in color.

EXAMPLE 12

Blend of PES-III with Copolyimide of SPAN, BAP and PDA[BAP/PDA ratio=2/1]

Using the method of Example 10, a 2/3 blend by weight was prepared from 25.45 g SPAN (0.07106 mole), 16.41 g BAP (0.04763 mole), 2.54 g PDA (0.0235 mole) and 0.21 g PA (0.0014 mole) with 28 g PES-III. The $T_g$ of the blend was 238° C. by DSC and 260° C. by DMTA.

EXAMPLE 13

Blend of PES-III with Copolyimide of SPAN, BAP and MDA[BAP/MDA ratio=2/1]

Using the method of Example 10, a 1/1 blend by weight was prepared from 35 g PES-III, 21.30 g SPAN, 13.72 g BAP and 2.12 g MDA; no PA was used. The process temperature was about 320° C. The blend had a single $T_g$ at about 239° C. and the blend extrudate was amber in color and transparent.

Examples 10–13 illustrate the miscibility of PES-III with SPAN/BAP/PDA and SPAN/BAP/MDA copolyimides in all proportions when the mole ratio BAP/PDA or BAP/MDA is approximately 2:1.

EXAMPLE 14

Blend of PES-III with Copolyimide of SPAN, BAP and MDA[BAP/MDA ratio=1/1]

Using the method of Example 10, a 65/35 blend by weight was prepared from 45.5 g PES-III, 14.94 g SPAN (0.0417 mole), 7.18 g BAP (0.0208 mole), 2.25 g MDA (0.0208 mole) and 0.12 g PA (0.0008 mole). The $T_g$ of the blend was 227° C. by DSC. The blend extrudate was brown in color and hazy in appearance when compression molded into a 20 mil-thick plaque. While only one $T_g$ was detected, the rather low value of 227° C. (only about 10° C. higher than that of PES-III) suggests the blend may not be miscible.

This result indicates that blends of PES-III and SPAN/BAP/PDA (or MDA) will be two-phase (immiscible) when the BAP/PDA or the BAP/MDA mole ratios fall below about 1:1.

EXAMPLE 15

Blend of PES-III with Copolyimide of SPAN, BAP and BAPP[BAP/BAPP ratio=2/1]

Using the method of Example 10, a 1/1 blend by weight was prepared from 32.5 g PES-III, 18.22 g SPAN, 11.75 g BAP and 6.89 g BAPP; no PA was used. The process temperature was about 345° C. The blend had two Tg's, at 226° C. and 248° C.

The lower $T_g$, 226° C., is higher than that of PES-III indicating that the low $T_g$ component contains a significant concentration of the polyimide and that the two polymers are therefore partially miscible. This example demonstrates that PDA or MDA must be a component of the polyimide if the copolyimide is to be fully miscible with PES-III. This condition is not a requirement with blends comprising biphenyl-containing PAES resins, however.

EXAMPLE 16

Blend of PES with Copolyimide of SPAN, BAP and PDA[BAP/PDA ratio=2/1]

Using the method of Example 10, a 1/1 blend by weight of PES and polyimide was prepared from 35 g PES, 21.30 g SPAN, 13.72 g BAP and 2.12 g PDA. The processing temperature was in the 350°–360° C. range. The blend was transparent and had a single Tg at 242° C. by DSC.

EXAMPLE 17

Blend of PES with Copolyimide of SPAN, BAP and MDA[BAP/MDA ratio=2/1]

Using the method of Example 10, a 1/1 blend by weight of PES and polyimide was prepared from 35 g PES, 21.30 g SPAN, 13.72 g BAP and 2.12 g MDA. The processing temperature was about 345°–350° C. DSC evaluation showed the blend to have two glass transition temperatures of 239° C. and 268° C.

This result indicates that the two polymers are partially miscible as the $T_g$'s of the individual components have both shifted toward the midpoint. This blend possesses melt-fabricability as evidenced by the successful extrusion. Furthermore, such blends possess the unique feature of having a very high $T_g$(268° C.) component. This confers on the blend high thermal resistance when it is reinforced with chopped glass, carbon fibers or other reinforcing fillers.

EXAMPLE 18

Copolyimide from SPAN, BAP and PDA[BAP/PDA ratio=2/1]

A copolyimide was prepared by adding 1747 g BAP (5.071 mole) and 274.0 g PDA (2.535 mole) to a 15 gal. glass-lined reactor, followed by 31 kg of NMP. The mixture was stirred for 45 min to dissolve the diamines, and then 2724 g of SPAN (7.606 mole) were added over a 30 min period, followed by 11.26 g PA (0.0760 mole) as a molecular weight control agent. The solution was stirred for 3 hrs to form the polyamide-acid intermediate. During the addition of the reactants and during the stirring, the average process temperature was about 37° C.

After adding 3.18 g kg of toluene, the reaction vessel was heated to a temperature between 149° C. and 168° C. and held for about 9 hrs while removing the water/toluene azeotrope as the polyamide-acid imidized, and to increase solids content by removing some of the NMP solvent. The polyimide coagulated by pouring the reaction mixture into water, collected, washed seven times with water, filtered and dried. The inherent viscosity of the product was 0.55 dl/g.

EXAMPLE 19

Blend of PES-III with Copolyimide of SPAN, BAP and PDA[BAP/PDA ratio=2/1]

A 65/35 mixture of PES-III and copolyimide by weight was prepared by first dry-blending 472.5 g of the copolyimide of Example 18 with 877.5 g PES-III which had been ground on a Wiley Mill using a 2 mm mesh screen. The mixture was extruded through the 15 mm APV twin-screw extruder at 340° C. to provide the blend in pellet form.

The pellets were dried overnight in a steam-heated vacuum oven at a temperature of about 110° C., then injection molded into ⅛" ASTM tensile and flexural bars, using a Boy 30M injection molding machine equipped with a 20 gram injection capacity barrel. The barrel temperature profile was 370°–375° C. with a nozzle temperature of 380° C. Mold temperature was set at 175° C. DMTA and pendulum impact strength data were obtained using compression molded, 20 mil-thick 4"×4" plaques, shear cut into ⅛" strips. The property data are summarized in Table III.

EXAMPLE 20

Blend of PES-III with Copolyimide of SPAN, BAP and PDA[BAP/PDA ratio=2/1]

The procedure described in Example 19 was used to prepare a 1/1 blend by weight of PES-III and the copolyimide prepared in Example 18. The blend, which was transparent as extruded, was pelletized, dried, injection molded, and tested following the procedures in Example 19. The data are summarized in Table III.

The above two examples (19 and 20) illustrate that the copolyimide from SPAN/BAP/PDA in the molar proportions 1:0.67:0.33 is fully miscible with PES-III. Although the polyimide has a $T_g$ of about 300° C. and is not melt-processable as a neat resin, the combination with PES-III provides a processable blend composition. When blended with copolyimide, the polyether sulfone glass transition temperature is raised without significant loss of flexibility in the resulting thermoplastic blend when mixed in at the molecular scale.

TABLE III

| | | Example No. | | | | |
|---|---|---|---|---|---|---|
| | | 19 | 20 | C | 1 | A |
| PES-III | pbw | 65 | 50 | 100 | — | — |
| Co-polyimide | pbw | 35 | 50 | — | 100 | — |
| Polyimide | pbw | — | — | — | — | 100 |
| DMTA Tg | (°C.) | 249 | 259 | 228 | 305 | 291 |
| HDT | (°C.) | 212 | 222 | 204 | — | — |
| T. Mod. | Kpsi | 437 | 434 | 382 | 263 | 271 |
| T. Str. | Kpsi | 13.5 | 14.5 | 11.5 | 12.5 | 14 |
| El./yield | % | 7.0 | 7.7 | 6.6 | — | — |
| El./break | % | 11.6 | 9.7 | 96 | 8.0 | 10 |
| Flex. Str. | Kpsi | 17.8 | 17.8 | 16.8 | — | — |
| Flex. M. | Kpsi | 450 | 461 | 431 | — | — |
| Izod, notch | ft-lb/in | 1.6 | 1.4 | 1.4 | — | — |
| Izod, no notch | ft-lb/in | 58** | 33** | * | — | — |
| T. Impact | ft-lb/in² | 106 | 86 | 175 | — | — |

Notes:
PES-III, see text;
Copolyimide = SPAN-BAP-PDA copolymer of Example 1;
Polyimide = SPAN-BAP homopolymer of Comparison Example A;
Compositions are in parts-by-weight (pbw); for additional description, see text.
DMTA Tg = glass transition temperature, by dynamic mechanical thermal analysis;
T. Mod. = tensile modulus;
T. Str. = tensile strength;
El. = elongation;
T. Impact = tensile impact;
Izod = Izod impact;
HDT = heat deflection temperature, 264 psi, 0.125" annealed specimen;
Flex. M. = flexural modulus;
Flex. Str. = flexural strength;
*no break;
**not all samples broke.
See text for sample preparations, test methods.

It will be apparent from a comparison of the property data for the blends of Examples 19 and 20 that the blends of this invention provide molded articles substantially improved in rigidity, as shown by tensile modulus. In addition, the blends are improved in thermal properties over the polyether sulfone as shown by a comparison of HDT values. The polyimide and copolyimide, Example 1 and Comparison Example A, are not injection moldable; consequently, those mechanical properties requiring injection molded specimens could not determined.

The blends of this invention are thermoplastic, and soluble, and therefore may be used as thermoplastics in producing molded and extruded goods. They may be fabricated into any desired shape, including molded articles such as gears, bearings, and the like, and may be used as films or the form of coatings, fibers and the like. It will be recognized that the blends of this invention may be combined with conventional additives and fillers, such as, for example, mineral fillers such as chalk, calcite, dolomite and the like; silicates including mica, talc, wollastonite; silicon dioxide; glass in the form of beads, spheres, flakes, powders and the like; as well as such fillers as aluminum powders and flakes, clays, quartz, and the like, according to methods and processes well known in the art. When combined with reinforcing fibers, either in chopped or continuous form, including fiberglass, carbon fibers and filaments, high-temperature resin filaments such as Kevlar filaments, pulp and flock and the like may be used, the blends may also be used for the production of filled compositions, composites and laminates. Other conventional additives employed in the art such as pigments, thermal stabilizers, ultraviolet light stabilizers, plasticizers and the like, may also be employed.

COMPARISON EXAMPLE F

Additional blends comprising a copolyimide according to this invention and a polymer of bisphenol A and 4,4'-dichlorodiphenyl sulfone, obtained as UDEL® P1700 polysulfone from Amoco Performance Products, Inc. The 50/50 blend with the copolyimide of Example 1 exhibited two Tg values of 202° C. and 280° C., determined by DMTA. The Tg specimen broke during DMTA testing, and the 280° value was approximated. The blend was extremely brittle, an indication of incompatibility of the blend components, and determination of the mechanical properties was not possible.

The copolyimides of this invention thus appear to exhibit surprisingly good compatibility with a variety of polyether sulfone resins, although not all such copolyimides are completely miscible in all proportions with every polyether sulfone resin. Where the SPAN-BAP polyimide of the prior art is immiscible or only partially miscible with polyether sulfone resins, blends comprising the copolymers of this invention with polyether sulfone resins are surprisingly miscible even though the polyether sulfone resins have no biphenyl units. The copolyimides are not miscible with other sulfone-containing resins, as will be seen by considering Comparison Example F, wherein blends comprising the copolyimide and a polysulfone are shown to be immiscible to the point of incompatibility, producing extremely brittle molded specimens.

The miscibility of the SPAN-BAP copolyimides with polyether sulfone resins as well as the unusual rigidity of the blends they form, shown by their tensile modulus values and the good thermal properties as reflected by their HDT values, are therefore highly surprising and unexpected.

The invention will thus be understood to be a blend comprising a polyether sulfone and an imide-containing copolymer or copolyimide, wherein the copolyimide comprises the dianhydride sulfonyl bis(phthalic anhydride) ("SPAN"), the diamine 1,4-bis(p-aminocumyl) benzene ("BAP") and, as a comonomer diamine, at least one aromatic diamine selected from the group consisting of m-phenylene diamine ("MDA"), p-phenylene diamine ("PDA"), oxybisaniline ("ODA"), 2,2-bis(4-aminophenyl) propane and 2,2-bis(4-aminophenoxyphenyl) propane ("BAPP"). More preferably, the diamine comonomer will be at least one diamine selected from ODA, MDA and PDA, and still more preferably the diamine will be PDA. The diamine component of the polyimide will comprise from about 10 to 90 mole % BAP diamine, based on total aromatic diamine, the balance being the diamine comonomer or comonomers. The preferred copolyimide components will be those wherein the diamine is comonomer is PDA and the BAP:PDA mole ratio is greater than 1:1, preferably at least 2:1 and most preferably will lie in the range of from about 1:1 to about 9:1, preferably from about 2:1 to about 9:1. The blends of this invention exhibit unexpected miscibility with a wide range of polyether sulfone resins, and are therefor particularly useful as melt- and solution- processable blends with an attractive balance of physical properties suitable for a wide variety of uses.

It will be readily understood by those skilled in the polymer arts that although the polymer components of the blends set forth herein are described for convenience in terms of monomers employed in their preparation and the conventional methods used for polymerization of such monomers, alternative processes and monomers may be employed to provide polymers having the same or equivalent structures, and blends comprising such polymers are also considered to be within the scope of this invention. These and other variations and modifications will be understood and recognized by those skilled in the thermoplastic resin and resin compounding arts to be fully within the ambit of the invention set forth and described herein, the scope thereof being defined solely by the claims appended hereto.

We claim:

1. A composition comprising a blend of polyether sulfone and an imide-containing copolymer of sulfonyl bis(phthalic anhydride), 1,4-bis(p-aminocumyl) benzene and at least one aromatic diamine selected from the group consisting of m-phenylene diamine, p-phenylene diamine, oxybisaniline, 2,2-bis(4-aminophenyl) propane, and 2,2-bis(4-aminophenoxyphenyl) propane, wherein said polyether sulfone does not contain a biphenyl unit.

2. The composition of claim 1 wherein said aromatic diamine is selected from m-phenylene diamine, p-phenylene diamine and oxybisaniline.

3. The composition of claim 1 wherein said aromatic diamine is p-phenylene diamine.

4. A composition comprising a blend of polyether sulfone and an imide-containing copolymer of sulfonyl bis(phthalic anhydride), from about 10 to about 90 mole % 1,4-bis(p-aminocumyl) benzene and from about 90 to about 10 mole % aromatic diamine selected from m-phenylene diamine and p-phenylene diamine.

5. A composition comprising a blend of polyether sulfone and an imide-containing copolymer of sulfonyl bis(phthalic anhydride), from about 10 to about 90 mole % 1,4-bis(p-aminocumyl) benzene and from about 90 to about 10 mole % aromatic diamine selected from m-phenylene diamine and p-phenylene diamine, wherein said polyether sulfone polymer does not contain a biphenyl unit.

6. The composition of claim 4 wherein said aromatic diamine is p-phenylene diamine, and wherein the mole ratio of said 1,4-bis(p-aminocumyl) benzene to said p-phenylene diamine lies in the range of from about 1:1 to about 9:1.

7. The composition of claim 6 wherein mole ratio of said 1,4-bis(p-aminocumyl) benzene to said p-phenylene diamine is about 2:1.

8. The composition of claim 4 wherein said polyether sulfone is a polymer of 4,4'-dichlorodiphenyl sulfone and at least one dihydric phenol selected from hydroquinone and 4,4'-dihydroxydiphenyl sulfone.

9. A composition comprising a blend of (a) a polymer of 4,4'-dichlorodiphenyl sulfone and at least one dihydric phenol selected from hydroquinone and 4,4'-dihydroxydiphenyl sulfone and (b) a copolyimide of sulfonyl bis(phthalic anhydride), from about 10 to about 90 mole % 1,4-bis(p-aminocumyl) benzene and from about 90 to about 10 mole % aromatic diamine selected from m-phenylene diamine and p-phenylene diamine.

10. A composition comprising a blend of (a) a polymer of 4,4'-dichlorodiphenyl sulfone and at least one dihydric phenol selected from hydroquinone and 4,4'-dihydroxydiphenyl sulfone and (b) a copolyimide of sulfonyl bis(phthalic anhydride), from about 10 to about 90 mole % 1,4'-bis(p-aminocumyl) benzene and from about 90 to about 10 mole % aromatic diamine selected from m-phenylene diamine and p-phenylene diamine, wherein the polymer of said component (a) does not contain a biphenyl unit.

11. The composition of claim 9 wherein component (b) is a copolyimide of sulfonyl bis(phthalic anhydride), 1,4-bis(p-aminocumyl) benzene and p-phenylene diamine, the mole ratio of said 1,4-bis(p-aminocumyl) benzene to said p-phenylene diamine being in the range of from about 1:1 to about 9:1.

12. The composition of claim 11 wherein component (a) is a polymer of 4,4'-dichlorodiphenyl sulfone, hydroquinone and 4,4'-dihydroxydiphenyl sulfone.

13. The composition of claim 11 wherein component (a) is a polymer of 4,4'-dichlorodiphenyl sulfone and 4,4'-dihydroxydiphenyl sulfone.

14. The composition of claim 11 wherein the mole ratio of said 1,4-bis(p-aminocumyl) benzene to said p-phenylene diamine is about 2:1.

* * * * *